(12) United States Patent
Conner

(10) Patent No.: US 8,329,035 B2
(45) Date of Patent: Dec. 11, 2012

(54) SUSPENDED MEDIA GRANULAR ACTIVATED CARBON MEMBRANE BIOLOGICAL REACTOR SYSTEM AND PROCESS

(75) Inventor: William G. Conner, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 13/114,550

(22) Filed: May 24, 2011

(65) Prior Publication Data

US 2011/0247978 A1    Oct. 13, 2011

Related U.S. Application Data

(63) Continuation of application No. 12/747,680, filed as application No. PCT/US2008/013987 on Dec. 19, 2008, now Pat. No. 7,972,512.

(60) Provisional application No. 61/008,606, filed on Dec. 19, 2007.

(51) Int. Cl.
*C02F 3/00* (2006.01)
(52) U.S. Cl. ......... 210/615; 210/616; 210/189; 210/694
(58) Field of Classification Search .......... 210/615–618, 210/694, 189
See application file for complete search history.

(56) References Cited

U.S. PATENT DOCUMENTS

| | | | | |
|---|---|---|---|---|
| 3,776,853 | A | * | 12/1973 | Minter .......................... 510/285 |
| 4,221,695 | A | * | 9/1980 | Hino et al. .................... 523/205 |
| 4,265,747 | A | | 5/1981 | Copa et al. |
| 4,371,454 | A | * | 2/1983 | Hisatsugu et al. ................. 502/9 |
| 4,495,056 | A | | 1/1985 | Venardos et al. |
| 4,623,464 | A | | 11/1986 | Ying et al. |
| 4,626,354 | A | | 12/1986 | Hoffman et al. |
| 4,656,153 | A | * | 4/1987 | Wennerberg .................. 502/182 |
| 4,749,492 | A | | 6/1988 | Berrigan, Jr. et al. |
| 4,778,598 | A | | 10/1988 | Hoffman et al. |
| 4,810,386 | A | | 3/1989 | Copa et al. |
| 4,897,196 | A | | 1/1990 | Copa et al. |

(Continued)

FOREIGN PATENT DOCUMENTS

CN    1098815 C    1/2003

(Continued)

OTHER PUBLICATIONS

Nsf Product and Service Listings,"Picasorb 16", http://www.nsf.org/Certified/PwsComponents/listings.asp?standard=061&company=57090& (undated) (downloaded 9/26/11).*

(Continued)

*Primary Examiner* — Chester Barry
(74) *Attorney, Agent, or Firm* — Abelman, Frayne & Schwab

(57) ABSTRACT

A system and process for treating an industrial wastewater stream is provided using a membrane biological reactor in which granular activated carbon material is introduced into an aeration portion and maintained upstream of a membrane operating system. The size of the granules of activated carbon is selected so that they can be screened or otherwise readily separated from the mixed liquor stream before the mixed liquor enters the membrane operating system tank(s) containing the submerged membranes, thereby preventing abrasion of the membrane by the carbon granules. The aeration portion includes a waste discharge port whereby a portion of spent granular activated carbon can be removed when the effluent concentration of chemical oxygen demand compounds approaches limits typically set by governmental agencies, and replaced by addition of fresh or regenerated granular activated carbon having greater adsorbent capacity.

24 Claims, 3 Drawing Sheets

U.S. PATENT DOCUMENTS

| | | | |
|---|---|---|---|
| 4,919,815 A | | 4/1990 | Copa et al. |
| 4,956,093 A | * | 9/1990 | Pirbazari et al. .............. 210/616 |
| 5,126,050 A | | 6/1992 | Irvine et al. |
| 5,192,442 A | | 3/1993 | Piccirillo et al. |
| 5,302,288 A | | 4/1994 | Meidl et al. |
| 5,486,292 A | | 1/1996 | Bair et al. |
| 5,505,841 A | * | 4/1996 | Pirbazari et al. ................ 210/90 |
| 5,560,819 A | | 10/1996 | Taguchi |
| 5,649,785 A | | 7/1997 | Djerf et al. |
| 5,653,883 A | | 8/1997 | Newman et al. |
| 5,932,099 A | | 8/1999 | Cote et al. |
| 5,972,211 A | | 10/1999 | Jones |
| 6,030,529 A | | 2/2000 | Biskner et al. |
| 6,048,459 A | | 4/2000 | Khudenko |
| 6,077,424 A | * | 6/2000 | Katsukura et al. ............ 210/151 |
| 6,132,600 A | | 10/2000 | Marchesseault et al. |
| 6,773,598 B2 | | 8/2004 | Byers et al. |
| 6,863,818 B2 | * | 3/2005 | Daigger et al. ............... 210/616 |
| 6,982,037 B2 | * | 1/2006 | Horng et al. .................. 210/615 |
| 7,172,701 B2 | * | 2/2007 | Gaid et al. .................... 210/616 |
| 7,329,344 B2 | | 2/2008 | Jordan et al. |
| 7,396,453 B1 | | 7/2008 | Probst |
| 7,678,268 B2 | | 3/2010 | Smith et al. |
| 2003/0132160 A1 | | 7/2003 | Khudenko |
| 2006/0225574 A1 | | 10/2006 | Braeunling et al. |
| 2007/0021300 A1 | | 1/2007 | Farant |
| 2007/0114182 A1 | | 5/2007 | DePoli et al. |
| 2007/0122609 A1 | * | 5/2007 | Hiltzik et al. .............. 428/304.4 |
| 2007/0123419 A1 | | 5/2007 | Le Bec |
| 2007/0209999 A1 | | 9/2007 | Smith et al. |
| 2008/0047895 A1 | | 2/2008 | Elefritz et al. |
| 2008/0283469 A1 | | 11/2008 | Pollock |
| 2010/0133182 A1 | * | 6/2010 | Sun et al. ...................... 210/636 |

FOREIGN PATENT DOCUMENTS

| | | |
|---|---|---|
| CN | 1490263 A | 4/2004 |
| CN | 1792872 A | 6/2006 |
| CN | 2009643668 Y | 10/2007 |
| EP | 0543579 A1 | 5/1993 |
| EP | 1258460 A2 | 11/2002 |
| GB | 1200366 | 7/1970 |
| GB | 1296233 | 11/1972 |
| GB | 1487789 | 10/1977 |
| GB | 1579623 | 11/1980 |
| JP | 58110412 A * | 7/1983 |
| JP | S62286591 | 12/1987 |
| JP | S6316096 | 1/1988 |
| JP | 10323683 A | 12/1998 |
| KR | 100302469 B1 | 7/2001 |
| KR | 20010096080 A | 11/2001 |
| RU | 74122 U1 | 6/2008 |
| RU | 2351551 C1 | 4/2009 |
| WO | 9010602 A1 | 9/1990 |
| WO | 9519322 A1 | 7/1995 |
| WO | 9521794 A1 | 8/1995 |
| WO | 9637444 A1 | 11/1996 |
| WO | 03062153 A1 | 7/2003 |
| WO | 2006053402 A1 | 5/2006 |
| WO | 2007062216 A2 | 5/2007 |

OTHER PUBLICATIONS

International Search Report and Written Opinion, PCT/US 08/13987, Mar. 19, 2009.

International Preliminary Report on Patentability, PCT/US08/13987, Jun. 18, 2010.

International Search Report and Written Opinion, PCT/US 10/38644, Aug. 11, 2010.

International Search Report and Written Opinion, PCT/US 10/38650, Aug. 23, 2010.

International Search Report and Written Opinion, PCT/US 10/41317, Sep. 1, 2010.

International Search Report and Written Opinion, PCT/US 10/41322, Sep. 1, 2010.

"PACT Systems: Cleaning up Industrial Wastewater in One Step," Siemens, Water Technologies, 301 West Military Road, Rothschild, WI 54474.

DynaSand, PDynaSand Filter Continuous Filtration Process, Parkson, 2009, 4 pages.

Thuy, Q.T.T. (2003) Treatment of inhibitory phenolic compounds by membrane bioreactor. Master's Thesis. Asian Institute of Technology, Thailand, 8 pages.

International Search Report for PCT/US07/05775, mailed Jul. 15, 2008, 3 pages.

Written Opinion of the International Searching Authority for PCT/US07/05775, mailed Jul. 15, 2008, 3 pages.

Chinese Patent Application No. 200880127140.8, Office Action dated Dec. 16, 2011.

* cited by examiner

SUSPENDED MEDIA GRANULAR ACTIVATED CARBON MEMBRANE BIOLOGICAL REACTOR SYSTEM AND PROCESS

RELATED APPLICATIONS

This application is a continuation application of U.S. application Ser. No. 12/747,680, now U.S. Pat. No. 7,972,512, which is a national phase application under 35 U.S.C. §371 of PCT/US2008/013987 filed on Dec. 19, 2008, which claims the benefit of U.S. Provisional Patent Application No. 61/008,606 filed Dec. 19, 2007, the disclosures of which are hereby incorporated by reference.

TECHNICAL FIELD

This invention relates to industrial wastewater treatment systems and methods, and more particularly to industrial wastewater treatment systems and methods using membrane biological reactors.

BACKGROUND ART

Effective handling of domestic sewage and industrial wastewater is an extremely important aspect of increasing the quality of life and conservation of clean water. The problems associated with simply discharging wastewater in water sources such as rivers, lakes and oceans, the standard practice up until about a half century ago, are apparent—the biological and chemical wastes create hazards to all life forms including the spread of infectious diseases and exposure to carcinogenic chemicals. Therefore, wastewater treatment processes have evolved into systems ranging from the ubiquitous municipal wastewater treatment facilities, where sanitary wastewater from domestic populations is cleaned, to specialized industrial wastewater treatment processes, where specific pollutants of various wastewater applications are addressed.

In general, wastewater treatment facilities use multiple treatment stages to clean water so that it may be safely released into bodies of water such as lakes, rivers, and streams. Presently, many sanitary sewage treatment plants include a primary treatment phase where mechanical means are used to remove large objects (e.g., bar screens), and a sand or grit channel where sand, grit and stones settle. Some treatment systems also include a stage where certain fats, greases and oils may float to the surface for skimming. The wastewater is then sent to a secondary biological activated sludge treatment phase. Activated sludge processes involve aerobic biological treatment in an aeration tank, typically followed by a clarifier/settling tank. The clarifier/settling tank effluent may or may not undergo further treatment steps before being discharged, and the sludge is recycled back to the aeration tank for further treatment, or is further treated before being disposed of in either a landfill, incinerator, or used as fertilizer if there are no toxic components.

In the aeration tank, air is added to the mixed liquor (a mixture of the feed wastewater and a large quantity of bacteria). The oxygen from the air is used by the bacteria to biologically oxidize the organic compounds that are either dissolved or carried in suspension within the wastewater feed. Biological oxidation is typically the lowest cost oxidation method available to remove organic pollutants from wastewater and is the most widely used treatment system for wastewater contaminated with biologically treatable organic compounds. Wastewaters that contain biologically refractory, or hard-to-treat, organic compounds or wastewaters that contain inorganic constituents are typically not able to be treated adequately by a conventional biological wastewater treatment system and often require more expensive methods to remove the pollutants.

The mixed liquor effluent from the aeration tank typically enters a clarifier/settling tank where waste sludge (concentrated mixed liquor suspended solids) settles by gravity. However, based on the wastewater and economic needs, some biological oxidation systems use a different treatment method to remove the solids from the wastewater effluent. The clarifier/settling tank can be replaced with a membrane (membrane biological reactor), or another unit operation such as a dissolved air flotation device can be used. The liquid effluent from the clarifier/settling tank, membrane or dissolved air flotation device is either discharged or given further treatment prior to discharge. The solids that are removed from the mixed liquor are returned to the aeration tank as return activated sludge for further treatment and in order to retain the bacteria in the system. Some portion of this return activated sludge is periodically removed from this recycle line in order to control the concentration of bacteria in the mixed liquor.

Increasingly, sanitary wastewater is being treated using membrane biological reactor technology, which offers improved effluent quality, a smaller physical footprint (more wastewater can be treated per square foot of treatment area), increased tolerance to upsets, improved ability to process hard-to-treat wastewaters (for example, wastewaters containing high total dissolved solids cannot be treated in a conventional clarifier/settling tank and requires significantly more difficult-to-operate solids settling device such as a dissolved air flotation device or some other solids removal system) and a variety of other operational advantages. However, membrane biological reactors often present problems with membrane fouling and foaming that do not occur in conventional systems using clarifiers. Membrane fouling is typically caused by extra-cellular polymeric compounds that result from the break-down of the biological life forms in the mixed liquor suspended solids.

One recent advance in conventional industrial biological wastewater treatment plant technology includes the addition of powdered activated carbon particles to the mixed liquor. In these processes, certain organic and inorganic compounds are physically adsorbed to the surface of the powdered activated carbon particles. One example of a known powder activated carbon system is offered by Siemens Water Technologies under the trademark "PACT®." Powdered activated carbon has been used in conventional biological treatment plants because of its ability to adsorb biologically refractory organic and inorganic compounds, thereby providing an effluent with lower concentrations of these pollutants. Inclusion of powdered activated carbon in the mixed liquor provides a number of operational benefits. The carbon provides the advantages of a suspended media biological treatment system which include increased pollutant removal and increased tolerance to upset conditions. Additionally, the carbon allows the biologically refractory organic materials to adsorb onto the surface of the carbon and to there be exposed to the biology for a significantly longer period of time than in a conventional biological treatment system, thereby providing benefits similar to that of a fixed film system. The carbon also allows for the evolution of specific strains of bacteria that are more capable of digesting the biologically refractory organic materials. The fact that the carbon is continuously recycled back to the aeration tank with the return activated sludge means that the bacteria can continually work on digesting the biologically refractory organic compounds adsorbed onto the surface of the carbon. This process also results in biological regeneration of the carbon and allows the carbon to remove significantly more biologically refractory compounds than it could in a simple packed bed carbon filter system which would also require frequent replacement or costly physical regeneration of the carbon once the adsorption capacity of the carbon is exhausted. The carbon in the mixed liquor can also adsorb and remove from the effluent the inorganic compounds that are not treatable by biological oxidation. However, to date, membrane biological reactors have not been utilized commercially with powdered activated carbon addition. There has been some use of powdered activated carbon in surface water treatment systems that utilize membranes for filtration. However, these surface water treatment systems using membranes and powdered activated carbon have been reported to have problems with the carbon abrading the membranes and the carbon permanently plugging and/or fouling the membranes.

Industrial wastewater that must be treated prior to discharge or reuse often include oily wastewaters, which can contain emulsified hydrocarbons. Oily wastewaters can come from a variety of industries including steel and aluminum industries, chemical processing industries, automotive industries, laundry industries, and crude oil recovery and refining industries. As discussed above, a certain amount of non-emulsified oils and other hydrocarbons may be removed in primary treatment processes, where floating oils are skimmed from the top. However, biological secondary wastewater processes are generally employed to remove the remaining oils from wastewater. Typical hydrocarbons remaining after primary treatment can include lubricants, cutting fluids, tars, grease, crude oils, diesel oils, gasoline, kerosene, jet fuel, and the like. The remaining hydrocarbons in the wastewater can be present in the range of from tens to thousands of parts per million. These hydrocarbons must be removed prior to discharge of the water into the environment or reuse of the water in the industrial process. In addition to governmental regulations and ecological concerns, efficient removal of the remaining hydrocarbons also has benefits, as adequately treated wastewater may be used in many industrial processes and eliminate raw water treatment costs and reduce regulatory discharge concerns.

Commercial deployment of membrane biological reactors in the treatment of oily/industrial wastewater has been very slow to develop, mainly due to maintenance problems associated with oil and chemical fouling of the membranes. Testing of industrial/oily wastewater treated in a membrane biological reactor having powdered activated carbon added to the mixed liquor indicated the same treatment advantages as observed in conventional biological wastewater treatment systems including powdered activated carbon. It was also noted that the advantages of using a membrane biological reactor can also achieved. However, the side-by-side comparison of membrane biological reactors with and without the addition of powdered activated carbon demonstrated that the membrane biological reactor with powdered activated carbon addition had all of the treatment advantages of the two systems whereas the membrane biological reactor without the carbon addition was very difficult if not impossible to operate because of residual oil and extra cellular polymeric compounds fouling the membranes. The testing further demonstrated that while the addition of powdered activated carbon provided a very viable biological wastewater treatment system, the carbon had the deleterious effect of a significant amount of abrasion to and non-reversible fouling of the membranes. This abrasion and non-reversible fouling was significant enough to result in this system being very costly to operate (because of the significantly decreased life expectancy of the membranes).

In certain types of water treatment processes not employing membrane biological reactors, granular activated carbon is used as an adsorbent medium in a fixed bed. For example, U.S. Pat. No. 5,126,050 to Irvine et al. describes a multistage process including a granular activated carbon filtration stage to adsorb organic contaminants from sources such as wastewater or spent granular activated carbon. The granular activated carbon is maintained in a tank, and the influent is provided at the bottom through a distributor to prevent fluidizing the granular activated carbon bed. Another example is Japanese Patent Application Number JP10323683 to Inoue et al. describes a water purification treatment method for obtaining potable water from raw water. The system includes a granular activated carbon bed within a water tank. Organic matter is adsorbed on granular activated carbon that includes aerobic bacteria adhered thereon. This system and process is described as treating water such as river water, lake water, pond water, and groundwater, rather than wastewater. In these systems the operating costs of having to either replace or regenerate the carbon once its adsorption capacity is exhausted is typically prohibitive. Furthermore, these systems do not utilize biological oxidation to either reduce the adsorptive capacity requirements or to regenerate the carbon.

In addition, European Patent Publication Number EP1258460 to Beyers et al. discloses a method for the biodegradation of oxygenates in groundwater or other water streams using packed beds of granular carbon inoculated with biodegraders. In particular, Beyers et al. discloses preferred embodiments where the granular carbon is inoculated with MTBE-degrading micro-organisms. While this system combines carbon adsorption of contaminants with biological oxidation, it was designed for a specific hard-to-treat wastewater need that allows for a significantly higher cost-of-treatment than is typical for biological treatment systems. Furthermore, it uses packed bed technology rather than a biological treatment system (such as membrane biological reactors).

The use of any of these above cited examples is limited to those applications where treatment cost is not an issue, as they are relatively expensive treatment methods. Additionally, none of them include the cost and operational advantages of a membrane biological reactor combined with carbon adsorption.

In other water purification applications, granular activated carbon is held in suspension in a body of water to be treated. For instance, European Patent Publication Number EP0543579 to Ford describes a process of removing pesticide residues and other organic substances from water. Activated carbon is added in a continuous manner, as spent activated carbon is continuously removed along with treated water. However, the system disclosed in the Ford reference requires a large amount of granular activated carbon to remove contaminants (pesticide residues). There is no biological mechanism for removing these contaminants.

Japanese patent documents JP62286591 and JP63016096 disclose organic waste water treatment methods involving a mixture of activated sludge slurry and granular activated carbon. These methods, disclosed prior to the development of immersed membrane biological reactors, use granular activated carbon in combination with ultra-filtration or reverse osmosis membranes in a downstream membrane system. These references address problems associated with organic wastewater (e.g., human waste) and do not practically address industrial wastes such as oily wastewater containing hydrocarbons. Additionally, this system was developed just as membrane biological reactors were first being tested, and its purpose was to prevent refractory organic compounds in the mixed liquor from fouling the membranes. It was speculated by the inventors that the use of membranes in place of a conventional clarifier/settling tank would ultimately result in toxic concentrations of organic compounds and interfere with the normal biological oxidation process in the aeration tanks. However, in practice it was found that this did not occur and as a result this technology was not commercialized. Furthermore, the primary application of the systems described in these references is treatment of sanitary wastewater having relatively low chemical oxygen demand (COD) compounds (e.g., COD to biological oxygen demand (BOD) ratios of about 2:1), in contrast to industrial wastewaters where the COD to BOD ratios are significantly higher.

As used herein, biologically refractory compounds refer to those types of COD compounds (organic and/or inorganic) in wastewater that typically do not break down with microorganisms within twelve hours of residence time.

Further, as used herein, bio-inhibitory compounds refer to compounds (organic and/or inorganic) in wastewater that inhibit the biological breakdown process.

Therefore, it is an object of the present invention to provide a process and apparatus in a membrane biological reactor system that employs granulated activated carbon to adsorb biologically refractory organic compounds and inorganic compounds onto the surface of granulated activated carbon and to maintain the granulated activated carbon in the biological reactor system upstream of the membrane separation step. This will provide the advantages of a suspended media membrane biological reactor which has had powdered activated carbon added to the mixed liquor, without the abrasion and fouling that accompanies the carbon in the mixed liquor coming in contact with the membranes.

Another object of the invention is to provide such a process and system that is efficient, that requires a minimal capital investment for installation, and has low operating costs.

Yet another object of the invention is to implement such a process and system that is particularly well suited for treatment of industrial and oily wastewaters.

SUMMARY OF THE INVENTION

The above objects and further advantages are provided by the system and process for treating an industrial wastewater stream using a membrane biological reactor, including introduction of granular activated carbon material into an aeration portion which is maintained upstream of a membrane operating system. The size of the granules of activated carbon is selected so that they can be screened or otherwise readily separated from the mixed liquor stream before entering the membrane operating system tank(s) containing the submerged membranes, thereby preventing abrasion of the membrane. The aeration portion includes a waste discharge port thereby allowing some spent granular activated carbon to be removed when the effluent concentration of chemical oxygen demand compounds approaches limits typically set by governmental agencies, and additional granular activated carbon having adsorbent capacity is added to the aeration tank.

In typical membrane biological reactor system, there are coarse and fine screens placed upstream of the aeration tank to prevent both large and small particles from settling in the system or from damaging the membranes. For instance, in domestic sewage membrane biological reactors, the fine screens also provide for the removal of hair which can intertwine with the membranes and cause operating problems. In the application of this invention, where the wastewater is industrial wastewater, there is an additional requirement of being able to screen the granular activated carbon from the mixed liquor before it enters into the membrane operating system tank where the membranes are located. This is achieved in various configurations. In one arrangement, there is a coarse screen and no fine screen upstream of the aeration tank, and there is a fine screen or screening system (with a mesh size smaller than the bottom limit effective granule size of the granular activated carbon that is being used) either located in the aeration tank or between the aeration tank and the membrane tank. In certain embodiments, coarse and fine screens (sized as necessary to remove the normal contaminants in the wastewater) are provided upstream of the aeration tank, and a screening system (sized to remove the granular activated carbon) is provided either in the aeration tank or between the aeration tank and the membrane tank. Therefore, an object of the invention is to provide a separation system that will prevent the granular activated carbon from leaving the aeration tank and entering the membrane operating system tank containing the membranes.

The use of granular activated carbon in the mixed liquor provides significant operational advantages to the membrane biological reactor as compared to a membrane biological reactor treating the same wastewater without granular activated carbon addition. The use of granular activated carbon with a screening/separation system (that will allow the majority of the granular activated carbon to be kept upstream of the membrane operating system tank where the membranes are present) will prevent the non-reversible fouling and abrasion that has been observed when powdered activated carbon was used in an membrane biological reactor and the carbon was allowed to come in contact with the membranes. The use of granular activated carbon with an effective size of at least about 0.3 millimeters will allow most or all of it to be filtered out of the mixed liquor stream that is transferred to the membrane operating system tank(s) for membrane filtration. Minimizing or eliminating the adsorbent materials in the membrane operating system tank(s) will reduce or eliminate the abrasion of the membrane that has been determined to be deleterious to the operating efficiency and useful life, for instance, of membrane biological reactors using powdered activated carbon.

The method and system herein which utilizes granular activated carbon in an membrane biological reactor system including a screening/separation system to prevent carbon from contacting the membranes provides various operational benefits, including more rapid acclimation of the mixed liquor to the wastewater feed, reduced fouling of the membranes, reduced foaming caused by extra-cellular materials, reduced abrasion of the membranes that result in a longer useful life expectancy for the membranes, improved tolerance to variations in the feed concentration and flow rate, improved sludge characteristics (e.g., quicker dewatering, fewer oily characteristics and ease in handling), and improved effluent quality (including a lower concentration of organic and inorganic impurities) as compared to the effluent quality obtained from a conventional membrane biological reactor system with a similar hydraulic retention time.

BRIEF DESCRIPTION OF THE FIGURES

The invention will be described in further detail below and with reference to the attached drawings in which like or similar elements are referred to by the same number, and where.

To facilitate understanding of the invention, identical reference numerals have been used when appropriate to designate the same or similar elements that are common to the figures.

DETAILED DESCRIPTION OF THE FIGURES

Figure 1:
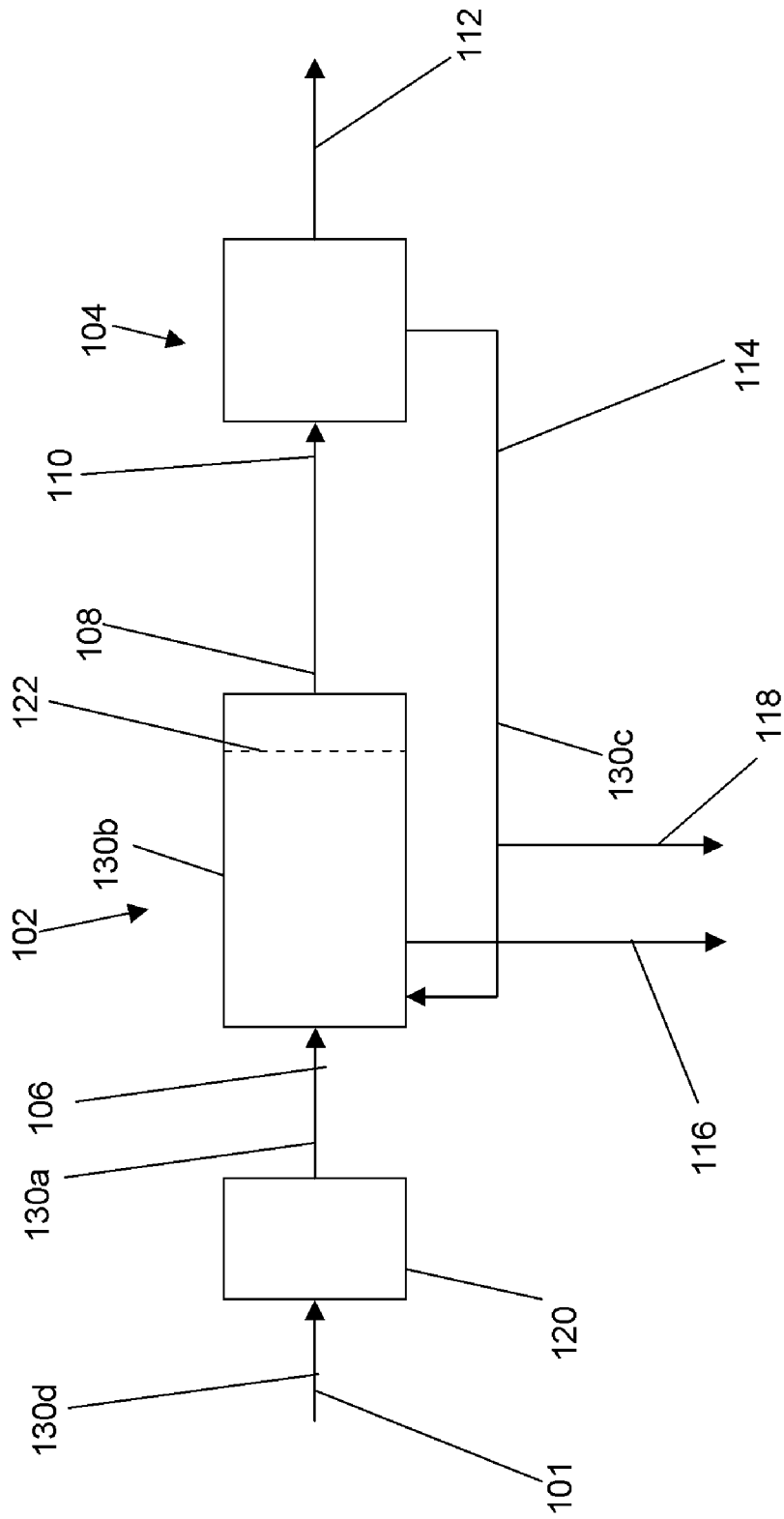
FIG. 1 is a schematic diagram of an embodiment of an apparatus for treatment of wastewater in accordance with the present invention.

FIG. 1 depicts a schematic of process flow of an industrial or oily wastewater processing system 100. System 100 generally comprises an aeration tank 102 and a membrane operating system tank 104. Aeration tank 102 includes an inlet 106 for receiving wastewater and an outlet 108 for discharged wastewater to the membrane operating system tank 104. The aeration tank 102 includes air diffusion apparatus as in known in the art of wastewater treatment for the purpose of aerating the mixed liquor. In addition, optional supplemental air diffusion apparatus may be included to maintain granular activated carbon in suspension as described further herein. Screened/separated effluent from the aeration tank 102 is introduced, via an inlet 110, to the membrane operating system tank 104. In the membrane operating system tank, the wastewater passes through one or more membranes as is known in the art of membrane biological reactors. An outlet 112 transfers treated effluent from the membrane biological reactor system 100. A return pipe 114 is connected between the membrane operating system tank 104 and the aeration tank 102 for transferring return activated sludge to the aeration tank 102. Spent granular activated carbon from the aeration tank 102 (i.e., granular activated carbon that is no longer effective in adsorbing biologically refractory compounds) can be removed via a mixed liquor waste discharge port 116. A waste outlet 118 can be connected to the return pipe 114 to divert some or all the return activated sludge for disposal to control the mixed liquor concentration. Seed culture is added to the aeration tank 102 to promote micro-organism growth.

A preliminary screening system 120 is located upstream of the inlet 106 of the aeration tank 102. This preliminary screening system can include a dissolved air floatation system, a coarse screen or a combination of these. Optionally, other types of preliminary treatment devices may be included depending on the particular wastewater being treated. A fine screen or separator subsystem 122 is included within the aeration tank 102. Optionally, or in combination with the fine screen or separator subsystem 122, a fine screen or separator subsystem can be provided between aeration tank 102 and the membrane operating system 104. The fine screen 122 can be a wedge wire screen or a rotating drum screen, or other separation process, that will prevent the granular activated carbon from passing through with the mixed liquor and thus coming into contact with the membranes in the membrane operating system 104. Screened or separated mixed liquor effluent from the aeration tank 102 may be pumped or flow by gravity (depending on the design of the particular system) into the membrane operating system 104. In a system using an external separation system (not shown), granular activated carbon separated from the mixed liquor passing through an external fine screen or separator subsystem can fall by gravity back into the aeration tank or be returned to the aeration tank 102 through a separate inlet.

Suitable types of screens or screening systems for use in the process and system of the invention include wedge wire screens, metal or plastic apertured plates, or woven fabrics, in cylindrical or flat configurations and arranged at various angles including vertically oriented, horizontally oriented, or any angle therebetween; or active screening systems such as a rotating drum screen. Other separation techniques including gravity settling in a quiescent zone can also be used.

In FIG. 1, wastewater feed stream passes through the preliminary screening system 120 and into the aeration tank 102. The aeration tank aerates the wastewater resulting in a mixed liquor (containing wastewater and mixed liquor suspended solids), together with the granular active carbon. Granular activated carbon (suitably pre-wetted, e.g., to form a granular activated carbon slurry) may be added to the wastewater at one or more locations 130a, 130b, and/or 130c within the system 100. For instance, granular activated carbon can be added to the feedstream downstream of the preliminary screening system 120 (e.g., location 130a). Optionally, or in combination, granular activated carbon can be added directly to the aeration tank 102 (i.e., location 130b). In certain preferred embodiments, granular activated carbon can be introduced via the return activated sludge line 114 (e.g., location 130c). In certain embodiments, it can be desirable to add the granular activated carbon ahead of the preliminary screening system 120 (e.g., location 130d), where the preliminary screening system 120 can be designed for this application by including screening that allows the granular activated carbon to pass therethrough and into the aeration tank 104. Mixed liquor passes through the fine screen or separator subsystem 122 and the granular activated carbon is removed from the mixed liquor suspended solids passing into the membrane operating system tank 104.

The granular activated carbon provides adsorption sites where hard-to-treat organic and inorganic compounds (biologically refractory, bio-inhibitory or otherwise) can adsorb. As the granular activated carbon remains in the system, micro-organisms grow and eventually evolve into mature strains with specific acclimation to break down the particular hard-to-treat compounds in the system. Furthermore, over additional time (e.g., several days to several weeks) that granular activated carbon having hard-to-treat compounds is maintained in the system, the micro-organisms having a high degree of specificity become second, third, and higher generations, thereby increasing their efficacy to biodegrade the particular hard-to-treat compounds.

Eventually, some or all of the granular activated carbon will become ineffective for treating the biologically refractory or bio-inhibitory compounds. This will result in a higher concentration of biologically refractory or bio-inhibitory compounds entering the membrane operating system, where they pass through the membranes. Granular activated carbon can reach its adsorption capacity (after initial acclimation), at which point further biologically refractory or bio-inhibitory compounds can no longer be adsorbed. In addition, granular activated carbon can become ineffective due to a phenomenon known as sliming, where the micro-organisms become coated with polysaccharides and/or extracellular polymer substances. This layer of slime, while initially service to protect the micro-organisms, can reach levels where it blocks the pore sites and thereby prevents access for hard-to-treat compounds, and consequently prevent biodegradation.

At this stage, when it is determined that granular activated carbon has lost all or a portion of its efficacy for reducing the effluent concentration of biologically refractory or bio-inhibitory compounds, some mixed liquor containing granular activated carbon can be drained from the aeration tank (via waste port 116). Additional granular activated carbon can be added, as described herein at one of the possible addition locations. The inlet wastewater and the effluent wastewater chemical oxygen demand (COD) compound concentrations (i.e., including biologically refractory or bio-inhibitory compounds) can be monitored to determine when the granular activated carbon and its accompanying biomass in the system have lost their effectiveness. A plot of the difference between the inlet and effluent COD divided by the inlet COD concentration will produce a plot that will shows the granular activated carbon in the mixed liquor's gradual loss of efficacy. The amount of COD removed from the feed stream can provide an indication of the relative amount of biologically refractory and/or bio-inhibitory organic compounds that are being removed from the wastewater feed. As an operator develops experience with treating their particular wastewater, they will be able to determine when this ratio indicates a point where there is a need to remove a portion of the granular activated carbon in the aeration tank and replace it with fresh carbon to regain the required removal efficiency for the biologically refractory and/or bio-inhibitory compounds, for instance, to maintain the effluent in compliance with regulatory requirements. Sampling and analysis of the effluent for concentrations of specific organic and inorganic compounds can also be used to determine when the granular activated carbon and its accompanying biomass in the mixed liquor is exhausted and in need of a partial replacement.

The operator of a membrane biological reactor system according to the invention herein can begin replacing some of the granular activated carbon when the effluent concentrations of specific organic or inorganic compounds start to approach their facility's permitted discharge concentrations for these compounds. The allowed discharge concentrations are typically limited by the facility's permit, for instance, as determined by the National Pollutant Discharge Elimination System (NPDES) permit program that is regulated by the United States Environmental Protection Agency, or other similar regulating body. As an operator develops experience operating this system with their wastewater, they will begin to be able to anticipate when to commence replacement the granular activated carbon. When the operator can determine that the effectiveness of the granular activated carbon and its accompanying biomass is approaching an inability to achieve the requisite effluent concentration of pollutants, the normal wasting of excess biomass that is performed by wasting return activated sludge from line 118 on FIG. 1 can cease and the excess biomass and the accompanying granular activated carbon is wasted from the aeration tank 102 via waste port 116. The amount of material wasted should be determined by what is required to maintain the mixed liquor suspended solids within the optimum operating range for the particular membrane biological reactor system being operated. After replacement of a portion of the granular activated carbon, the effluent should be monitored by the operator to determine whether the requisite removal efficiency has been restored. Additional, replacement can be made based on the operating experience of the operator.

In alternative embodiments, granular activated carbon can be removed from the screening while minimizing removal of mixed liquor. For instance, in systems where screening includes a rotary drum screen, granules of carbon can be scraped off to remove some of the granular activated carbon, and additional fresh granular activated carbon can be incorporated as necessary.

Suitable granular activated carbon granule sizes can be used to complement the selected screening/separation methods, depending on the needs of the particular wastewater being treated. In certain preferred embodiments, the bottom limit of effective granule size of the granular activated carbon is selected such that it may easily be separated from the flow of mixed liquor entering the membrane operating system tank(s) in which the membranes are located. In general, the effective granule size of the granular activated carbon has a bottom limit of about 0.3 millimeters, where greater than 99.5 weight % of the carbon is above the bottom limit; preferably having a bottom limit of about 0.3 millimeters to an upper limit of about 2 millimeters (corresponding to a mesh size 8 to a mesh size 40, based on United States Standard Sieve Series), where greater than 99.5 weight % of the carbon is within the bottom and upper limit; and in certain preferred embodiments about 0.5 millimeters to about 1.4 millimeters (corresponding to a mesh size 14 to a mesh size 35, based on United States Standard Sieve Series) where greater than 99.5 weight % of the carbon is within the bottom and upper limit. It has been demonstrated that a granular activated carbon with a minimum effective granule size of about 0.5 millimeters to about 0.6 millimeters can be easily screened from the mixed liquor with a suitable separation system, and such effective sizes, in granular activated carbon of suitable densities, also can be maintained in suspension under economically feasible operating conditions.

Smaller granule size granular activated carbon results in greater surface area available per pound of granular activated carbon for adsorption of biologically refractory and/or bio-inhibitory organics or inorganics. Additionally, smaller granule sizes of the granular activated carbon facilitate suspension in the mixed liquor (resulting in lower energy costs). However, smaller granule sizes of the granular activated carbon also result in more restrictive screening requirements, and increases the likelihood of damage to the membranes from fouling and abrasion by small particles that pass from the aerator tank.

On the other hand, a larger particle size granular activated carbon results in granular activated carbon that is easier to remove and a potential reduction in the permanent fouling and abrasion on the membranes. However, the energy required to keep the granular activated carbon in suspension increases with increasing granular activated carbon effective granule size, depending on the density of the carbon. Furthermore, to accommodate for decreased surface area (on a weight basis), a higher concentration of granular activated carbon can be used, depending on the particular wastewater feed. Suitable granule sizes can ultimately be determined based upon the desired operating costs of the system, where the cost of maintaining the granular activated carbon in suspension can vary greatly depending on the granule size and density.

After the mixed liquor is aerated and treated by the granular activated carbon in the aeration tank 102, the thus-processed mixed liquor passes through a fine screen or separator subsystem 122, and is transferred to the membrane operating system tank 104. The fine screen or separator subsystem 122 prevents the granular activated carbon from passing into the membrane operating system tank 104. By filtering the granular activated carbon (e.g., in the mixed liquor) and maintaining it in the aeration tank, the method and system herein minimizes or eliminates the likelihood of fouling and/or abrasion of the membrane operating system tank membranes by the granular activated carbon.

The membrane operating system tank 104 contains filtering membranes to filter the biomass and any other solids in the mixed liquor in the membrane operating system tank 104 from the effluent 112. These membranes, which can be in the form of hollow fiber membranes or other suitable configurations, as is known to those skilled in the art, are typically very expensive and it is highly desirable to protect them from damage and extend their useful life. In the method and system of the invention, the life of the membrane operating system tank and the membranes therein are extended, since the fine screens 122a and/or 122b substantially reduces or eliminates the granular activated carbon and other granules and particles entering the membrane operating system tank 104.

Outlet 112 transports filtered effluent from the membrane operating system tank 104. Return activated sludge line 114 transports a return activated sludge stream from the membrane operating system tank 104 to the aeration tank 102 for further processing of the wastewater feedstream. Excess sludge is wasted from the system from the waste line 118 as in a normal membrane biological reactor.

Figure 2:
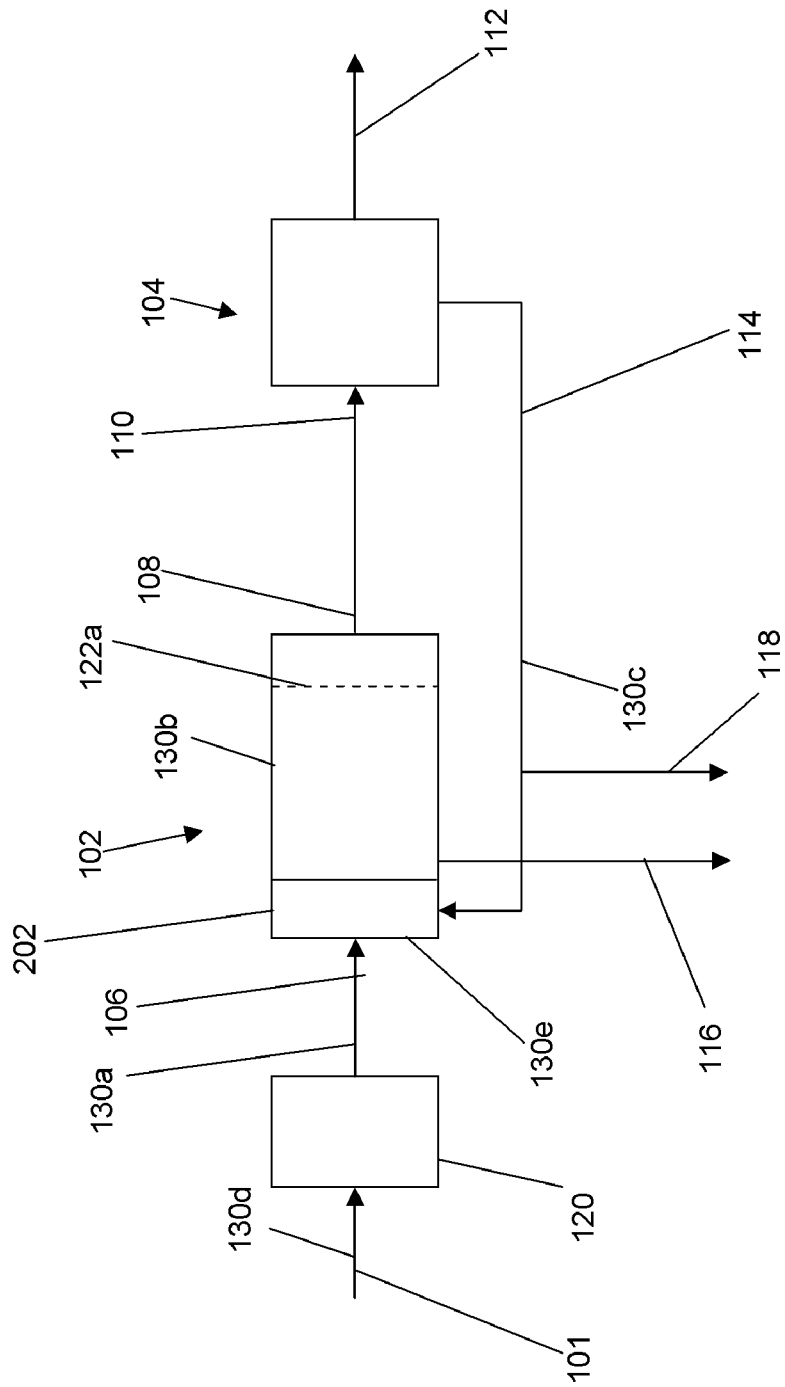
FIG. 2 is a second embodiment of the apparatus of FIG. 1 and includes a means for de-nitrification of the wastewater stream.

FIG. 2 shows an alternative embodiment of a membrane biological reactor system 200 that utilizes a common biological denitrification operation. Other specialized biological or chemical treatment systems required by a specific wastewater treatment need can also use this invention with appropriate modifications to the system that would be apparent to one skilled in the art of biological wastewater treatment. The embodiment of FIG. 2 is similar to the embodiment of FIG. 1, with the addition of an anoxic (oxygen-free) section 202. A simple organic carbon source, such as methanol or the biochemical oxygen demand content of the wastewater itself, provides the food for the de-nitrification process. Wastewater is introduced into the anoxic section 202, which is in fluid communication with the aeration tank 102. In addition, the return activated sludge stream line 114 transports the return activated sludge stream from the membrane operating system tank 104 to the anoxic section 202 for further processing. As in the system described in FIG. 1, there are multiple locations (130a, 130b, 130c, 130d and 130e) that the granular activated carbon can be added to the system. In a preferred embodiment, the granular activated carbon is added at location 130b. In all of the other potential granular activated carbon addition locations (130a, 130c, 130d and 130e), an additional mixing apparatus is added to the anoxic zone in order to keep the granular activated carbon in suspension. To effectively use these alternative feed locations 130a, 130c, 130d and 130e for granular activated carbon addition, the wastewater would need to require some special treatment (e.g., such as a problem with denitrification) to justify the additional operational costs of this mixing. Therefore, in certain preferred embodiments, granular activated carbon is not present in the mixed liquor in the anoxic zone unless a specific process requires its presence.

All wastewater treatment processes have individual needs which make them unique. Therefore, the optimum location(s) for the addition of the granular activated carbon is to be determined based on the needs of the specific application. The invention herein is not limited to those described with respect to FIGS. 1 and 2, but rather can be accommodated to different types of industrial and/or oily wastewater treatment facilities.

The size of the granular activated carbon and the granule size that the fine screening is designed to remove are optimized to minimize the amount of granular activated carbon and carbon fines entering the membrane operating system tank(s). Therefore, the method and system of the invention minimizes abrasion and fouling by carbon granules or particles impinging on the membranes, while still providing the operational advantages associated with the use of activated carbon.

The concentration of granular activated carbon in the mixed liquor is generally determined based upon the specific system parameters and wastewater to treat the particular combination of biologically refractory and/or bio-inhibitory organic or inorganic compounds to meet a facility's discharge requirements. Testing has indicated that operating a membrane biological reactor with a typical mixed liquor suspended solids concentration (in a normal range for the particular membrane biological reactor configuration employed) and a granular activated carbon concentration of about 20% (of the total mixed liquor suspended solids concentration) was adequate to remove the biologically refractory and/or bio-inhibitory organic compounds present in the wastewater feed without creating fouling problems on the screening systems. Higher concentrations of granular activated carbon can be added to provide an additional margin of safety against process upsets causing higher than normal concentrations of biologically refractory and/or bio-inhibitory organic or inorganic compounds in the effluent. Note that this additional granular activated carbon will result in increased screening requirements. The lowest concentration of granular activated carbon that can be utilized and still achieve the required effluent quality can be empirically determined, based upon a level of safety against process upsets that is deemed appropriate for the particular system and process.

The invention herein using granular activated carbon upstream of a membrane operating system tank to adsorb organic and inorganic materials (biologically refractory, bio-inhibitory or otherwise) as well as to provide for a suspended media membrane biological reactor is applicable for a variety of different configurations. In addition, various separation devices may also be used to maintain the granular activated carbon in the aeration tank. It will be appreciated by one of skill in the art that different systems will have different economic benefits based on the individual characteristics of the wastewater and the area where the facility is to be installed.

The factors that are controlled to produce optimal treatment conditions include the type of granular activated carbon, including its size, shape, hardness, specific gravity, settling rate, requisite air flow (or other suspension needs) for granule suspension in the mixed liquor (to maintain the granular activated carbon as a suspended media), origin of the carbon and the treatment of the carbon source, the screen bar spacing or opening size and hole configuration, the concentration of granular activated carbon in the mixed liquor, the concentration of the mixed liquor volatile suspended solids, the total concentration of mixed liquor suspended solids, the ratio of the return activated sludge flow rate divided by the flow rate of the mixed liquor entering the membrane operating system tank, the hydraulic retention time and the sludge retention time. This optimization provides adsorption of the biologically refractory organics in the wastewater by the granular activated carbon, and adsorption of some portion of the biologically refractory organics, easy to degrade biological oxygen demand compounds ($BOD_5$), bio-inhibitory compounds, inorganic compounds and extra-cellular polymeric substances by the granular activated carbon suspended in the mixed liquor.

Particularly suitable types of granular activated carbon that were determined to remove effective quantities of some known biologically refractory compounds, such as ethylenediaminetetraacetic acid (EDTA), di-n-butyl phthalate, 2,4-dinitrophenol, 2,4-dinitrotoluene, methyl tertiary butyl ether (MTBE), as well as unidentified chemical oxygen demand compounds, include those that have effective particle sizes of about 0.5 millimeters to about 0.6 millimeters and have a specific gravity of about 1.05 to about 1.10 (in water at 20°

C.). Furthermore, the desired granular activated carbon has a hardness level that minimizes creation of fines and other particulates due to inter-collision. Particularly useful granular activated carbon for use with the present invention includes granular activated carbons obtained from wood, coconut, bagasse, sawdust, peat, pulp-mill waste, or other cellulose derived materials. One suitable example is MeadWestvaco Nuchar® WV B having nominal mesh sizes of 14×35 (based on U.S. Standard Sieve Series).

The granules of activated carbon provide adsorption sites on which the micro-organisms in the mixed liquor can adhere and provide high removal efficiencies of organics without requiring proportionally longer hydraulic retention times and sludge retention times. These adsorption sites initially serve as adsorption sites for the biologically refractory or bio-inhibitory organic and inorganic compounds. As discussed above, eventually micro-organisms acclimated to the particular compounds in the wastewater will develop and mature, leading to increased biodegradation. This includes biodegradation of biologically refractory compounds, as they can be maintained in the pores of the granular activated carbon for longer than the typical residence time in an aeration tank. In addition, certain bio-inhibitory compounds can actually degrade, again, due to the increased time of exposure to mature micro-organisms.

The significantly improved removal of biologically refractory and/or bio-inhibitory organic and inorganic compounds of this process and system is the result of the combination of multiple features of this technology including but not limited to granular activated carbon adsorption, suspended media biological wastewater treatment, attached growth/fixed film biological wastewater treatment and membrane biological reactor wastewater treatment technologies. In the process and system of this invention; the use of granular activated carbon that is segregated from the mixed liquor passing into the membrane operating system of a membrane biological reactor allows the advantages of all of these treatment technologies to be realized in a single inexpensive to build, operate and maintain wastewater treatment system.

A benefit of the apparatus of the present invention is that the adsorption of the biologically refractory organics in the wastewater by the granular activated carbon allows the micro-organisms in the mixed liquor additional time to digest the biologically refractory organics in the lowest hydraulic retention time and sludge retention time possible. Sludge is discharged from the apparatus with the waste activated sludge when it increases to the point where the mixed liquor solids concentration is so high that it disrupts the operation of the particular membrane biological reactor system.

Another benefit of the system and method is the adsorption of some portion of the biologically refractory organics, bio-inhibitory compounds and inorganic compounds by the granular activated carbon suspended in the mixed liquor. Adsorption allows these compounds to be removed from the apparatus (when necessary) by wasting (waste port 116) excess mixed liquor from the aeration tank rather than from the return activated sludge line with the waste activated sludge, resulting in a lower concentration of refractory organics, bio-inhibitory and inorganic compounds in the discharge and a more stable biomass in the membrane biological reactor.

Still another benefit of the apparatus of the present invention is the adsorption of the extra-cellular polymeric substances in the mixed liquor by the granular activated carbon. Adsorption of these substances leads to a reduced rate of fouling on the membranes, a reduced rate of increase in the trans-membrane pressure drop over time, a reduced tendency to foam and a generally more stable membrane biological reactor operation. This feature of the improved system and process can be used to advantage with sanitary wastewater membrane biological reactors, as well as with oily and/or industrial wastewater membrane biological reactors.

Yet another benefit of the apparatus of the present invention is providing sites to which the micro-organisms in the mixed liquor suspended solids can adhere. This aspect of the process produces a mixed liquor volatile suspended solids stream that is more resilient in responding to upset conditions and allows enhanced bio-degradation of the organics present in the wastewater as compared to a non-granular activated carbon enhanced membrane biological reactor operated with similar hydraulic retention times and sludge retention times. A source of micro-organisms inside the pore spaces of the granular activated carbon serves as a source of seed bacteria in the event of an upstream process upset resulting in the loss of some of the viable micro-organisms floating free in the mixed liquor. In the event of a thermal shock to the system, which would, in conventional systems, terminate certain bacteria, some of the micro-organisms within the pore spaces can survive, thus only a fraction of the recovery time can be necessary as compared to conventional systems without granular activated carbon. For instance, in systems where the bacteria is mesophilic, thermal shock due to increased temperature, the granular activated carbon can allow some bacteria within the pore sites to survive. Likewise, in systems where the bacteria is thermophilic, thermal shock due to decreased temperature, the granular activated carbon can allow some bacteria within the pore sites to survive. In both of these circumstances, the time required for the cultures to reacclimate can be greatly reduced.

Still another benefit of the apparatus of the present invention is the high removal efficiencies of organics without requiring proportionally longer hydraulic retention times and sludge retention times. This reduces the production of extra-cellular polymeric substances that can cause operating problems in membrane biological reactors.

The combination of the five benefits identified above will result in a more rapid acclimation of the mixed liquor to the wastewater feed, reduce fouling of the membranes, an improved tolerance to variations in feed concentrations and flow rate, produce a sludge that can be dewatered more quickly with a less oily nature that is easier to handle, and an effluent having a lower concentration of organic and inorganic impurities than can be obtained from a conventional membrane biological reactor apparatus.

The use of granular activated carbon in place of powdered activated carbon eliminates the membrane fouling and abrasion that has been identified as a problem in powdered activated carbon membrane biological reactors testing.

Although the use of granular activated carbon in place of powdered activated carbon does not provide for as efficient a use of carbon on a weight basis, it does allow the carbon to be filtered out of the mixed liquor and eliminates the abrasion and fouling damage to the membranes. The impact of the reduced adsorption efficiency as a result of using granular activated carbon in place of powdered activated carbon does not, however, significantly impact the efficacy of the overall activated carbon-enhanced membrane biological reactor apparatus.

Testing has indicated that the principal mechanism of removal of the biologically refractory organics is related to an increase in the residence time that the refractory organics are exposed to the micro-organisms in the powdered activated carbon enhanced apparatus. Micro-organisms in the mixed liquor volatile suspended solids, adsorbed on the granular activated carbon, have a longer period of time to digest the refractory and non-refractory organics. Increased residence time for biodegradation has been shown to be a major factor in reducing the biologically refractory and non-refractory organic concentration in the membrane biological reactor effluent, and the higher adsorption efficiency of the powdered activated carbon is not required to achieve the desired results.

Granular activated carbon in a carbon-assisted membrane biological reactor performs as well or better than a powdered activated carbon enhanced membrane biological reactor in enhancing the removal of refractory organics and extra-cellular polymeric compounds. Also, because of its larger size, it can be effectively filtered from the mixed liquor that enters the membrane operating system tank(s). The abrasion that occurs when using the powdered activated carbon can be eliminated or very significantly reduced by employing granular activated carbon in accordance with the present invention.

While the use of the powdered activated carbon particles in a membrane biological reactor has demonstrated some of the same advantages described above for the granular activated carbon system, the observed membrane abrasion from the powdered activated carbon particles in the membrane operating system tank(s) is unacceptable since the membrane's useful life can be reduced to an unacceptable level, e.g., significantly less than a typical membrane warranty. Since the cost of the membranes represents a significant portion of the total cost of a membrane biological reactor system, their useful life is an important factor in the operating cost of the membrane biological reactor system.

Example

A pilot scale programmable logic controlled membrane biological reactor system (Petro™ MBR Pilot Unit available from Siemens Water Technologies, Rothschild, Wis., USA) having an aeration tank with an anoxic section, with an capacity of approximately 1,000 gallons (for pilot scale) and a membrane operating system equivalent to a commercial membrane biological reactor system, was modified to accommodate the granular activated carbon addition described in the present invention. A wedge screen was situated at the inlet of a pump that transferred mixed liquor from the aeration tank to the membrane operating system.

A base synthetic feedstock included water having the following concentrations of organic/inorganic matter: 48 grams/liter of sodium acetate; 16 grams per liter of ethylene glycol; 29 grams per liter of methanol; 1.9 grams per liter of ammonium hydroxide; and 0.89 grams per liter of phosphoric acid. The ammonium hydroxide and phosphoric acid were sources for proper nutrient balance for the bacteria within the membrane biological reactor system.

A sample refinery mixture was prepared having high concentrations of biologically refractory and/or bio-inhibitory organic compounds. Specifically, the sample refinery mixture contained following concentrations of biologically refractory and/or bio-inhibitory organic compounds: 90 milligrams/liter of EDTA; 30 milligrams/liter of di-n-butyl phthalate, 120 milligrams/liter of 2,4-dinitrophenol, 21 mg/L of 2,4-dinitrotoluene and 75 milligrams/liter of MTBE. The refinery mixture was fed to the anoxic tank.

The membrane biological reactor was first operated without granular activated carbon to obtain a baseline. It was determined that prior to the addition of granular activated carbon, only about 92% of the biologically refractory or bio-inhibitory organic chemical oxygen demand (COD) compounds in the effluent was removed, after a long period of bio-acclimation such that the membrane biological reactor was fully acclimated, thus allowing about 8% of these compounds (measured as COD) to pass into the effluent).

Figure 3:
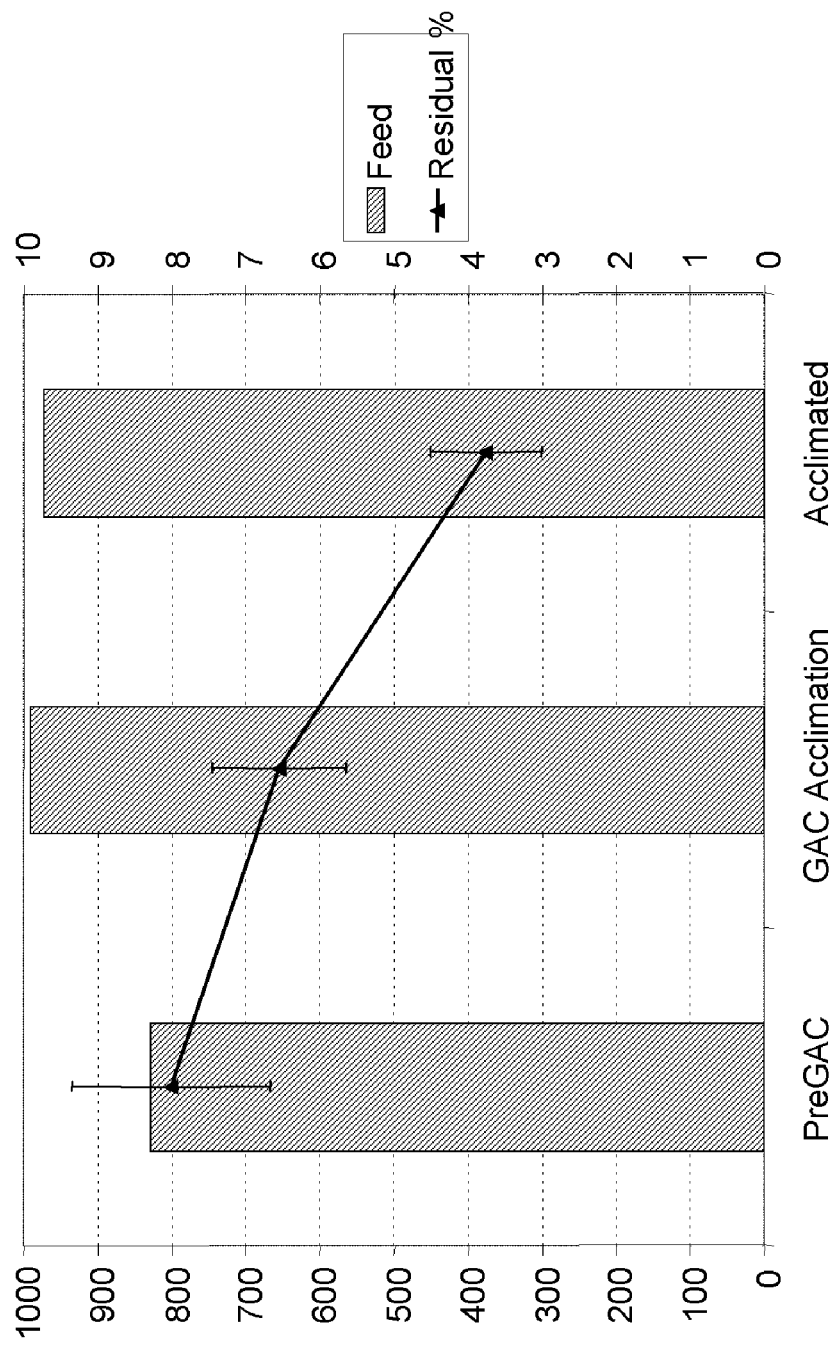
FIG. 3 is a chart depicting feed concentration (in milligrams per liter) of biologically refractory and bio-inhibitory compounds, and the remaining effluent concentrations (as percentages of the original), at various stages of a membrane biological reactor system.

To determine the efficacy of granular activated carbon, 3800 grams MeadWestvaco Nuchar® WV B having nominal mesh sizes of 14×35 (based on U.S. Standard Sieve Series) was added to the aeration tank and the blower supplying air to the aeration tank was adjusted to feed 75 standard cubic feet per minute (SCFM) to the aeration tank. The amount of granular activated carbon added to the aeration tank was based on 20 percent of the mixed liquor suspended solids in the unit, which was determined to be approximately 5000 milligrams per liter After acclimation of the granular activated carbon, the total membrane operating system effluent was less than 4%, therefore achieving greater than 96% removal of biologically refractory or bio-inhibitory organic compounds that were measured as COD. FIG. 3 is a chart depicting feed concentration (in milligrams per liter) of biologically refractory and bio-inhibitory compounds, and the remaining effluent concentrations (as percentages of the original), at various stages of a membrane biological reactor system. In particular, FIG. 3 shows the comparison between the effluent concentrations prior to addition of granular activated carbon (GAC), during the acclimation period, and after acclimation. Once granular activated carbon was added to the system, there was a very significant initial drop in effluent COD concentration, which not shown in FIG. 3 as the adsorption capacity of the granular activated carbon was exhausted in less than one day, followed by an increase to around 6.5% after the adsorptive capacity of the carbon was exhausted and the carbon and biomass started working together to digest the biologically refractory or bio-inhibitory organic compounds that were measured as COD. After the bacteria became fully established onto the surface of the granular activated carbon (as was confirmed with an electron microscope evaluation) the benefits of an attached growth/fixed film system were apparent. The residual COD in the effluent dropped to less than 4% of the feed COD, providing a COD removal efficiency of greater than 96% for a highly concentrated feed of biologically refractory or bio-inhibitory organic compounds.

Use of the method and apparatus of the invention eliminates the plugging and abrasion of the membranes by keeping the carbon out of the membrane operating system tank(s). By using larger sized carbon granules, carbon granule screening and/or separation is possible. On the other hand, the small particle size of the powdered activated carbon prevents its effective filtration from the mixed liquor.

The method and apparatus of the present invention have been described above and in the attached drawings; however, modifications will be apparent to those of ordinary skill in the art and the scope of protection for the invention is to be defined by the claims that follow.

What is claimed is:
1. A wastewater treatment system for reducing concentrations of biologically refractory and/or bio-inhibitory compounds in a treated effluent comprising:
    an aeration tank comprising
        a separation subsystem constructed and arranged to maintain granular activated carbon in the aeration tank with a mixed liquor; and
        a waste discharge port constructed and arranged to remove the granular activated carbon from the aeration tank in response to a measured level of at least a property of the treated effluent;

a granular activated carbon input location; and a membrane operating system tank located downstream of the aeration tank, constructed and arranged to receive mixed liquor from the aeration tank and to discharge the treated effluent.

2. The system as in claim 1, wherein the granular activated carbon input location includes one or more positions selected from the group consisting of upstream of the aeration tank, in direct communication with the aeration tank, and in communication with a return activated sludge stream that is discharged from the membrane operating system tank.

3. The system as in claim 1, wherein the granular activated carbon has an effective granule size of at least about 0.3 millimeters.

4. The system as in claim 1, wherein the granular activated carbon has an effective granule size of about 0.5 millimeters to about 1.4 millimeters.

5. The system as in claim 1, wherein the granular activated carbon adsorbs compounds from the wastewater stream selected from the group consisting of biologically refractory organics, bio-inhibitory compounds, inorganic compounds, and combinations thereof.

6. The system as in claim 1, wherein the aeration tank comprises a denitrification section.

7. The system as in claim 6, wherein the granular activated carbon is maintained in the aeration tank separate from the denitrification section.

8. The system as in claim 1, wherein the granular activated carbon comprises pore spaces in which micro-organisms attach and produce additional micro-organisms for digesting biologically refractory compounds in the wastewater stream.

9. The system as in claim 1, wherein the wastewater comprises oil.

10. The system as in claim 1, wherein the granular activated carbon has a specific gravity of about 1.05 to about 1.10 in water at 20° C.

11. The system as in claim 1, wherein the granular activated carbon has a hardness level that minimizes creation of fines and other particulates caused by intercollision of granules.

12. The system as in claim 1, wherein the granular activated carbon is derived from materials selected from the group consisting of wood, coconut, bagasse, sawdust, peat, pulp-mill waste, and other cellulose derived materials.

13. A process for purifying a wastewater stream comprising:
introducing the wastewater stream into an aeration tank with a seed bacteria culture to produce a mixed liquor;
introducing granular activated carbon into the aeration tank;
maintaining the granular activated carbon in a suspension within the aeration tank for a period sufficient to develop mature micro-organisms within pores of the granular activated carbon that are effective in treating the biologically refractory and/or bio-inhibitory compounds that are adsorbed by the granular activated compounds; and
passing a mixed liquor effluent from the aeration tank that is substantially free of granular activated carbon to a membrane operating system tank.

14. The process as in claim 13, wherein passing a mixed liquor effluent from the aeration tank that is substantially free of granular activated carbon comprises screening the mixed liquor discharged from the aeration tank.

15. The process as in claim 13, further comprising
removing a portion of the granular activated carbon from the aeration tank when the efficacy of the granular activated carbon is reduced to a predetermined level; and
introducing additional granular activated carbon having a greater efficacy into the aeration tank.

16. The process as in claim 15, wherein removing the portion of the granular activated carbon includes wasting mixed liquor containing granular activated carbon.

17. The process as in claim 13, wherein the granular activated carbon has a specific gravity of about 1.05 to about 1.10 in water at 20° C.

18. The process as in claim 13, wherein the granular activated carbon has a hardness level that minimizes creation of fines and other particulates caused by intercollision of granules.

19. The process as in claim 13, wherein the granular activated carbon is derived from materials selected from the group consisting of wood, coconut, bagasse, sawdust, peat, pulp-mill waste, and other cellulose derived materials.

20. A process for treating a wastewater stream comprising:
suspending granular activated carbon in a mixed liquor contained in an aeration tank of a membrane biological reactor;
passing the mixed liquor through a separation system located in the aeration tank to retain the granular activated carbon in the aeration tank to form a separated effluent;
introducing the separated effluent to an inlet of a membrane operating system tank to form a treated effluent; and
removing at least a portion of the mixed liquor comprising granular activated carbon from the aeration tank in response to a property of at least one of an inlet wastewater stream and the treated effluent.

21. The process of claim 20, further comprising introducing additional granular activated carbon at one or more locations including upstream of the aeration tank, in the aeration tank, and in a return activated sludge stream.

22. The system as in claim 1, wherein the aeration tank further comprises a population of one or more active waste-digesting bacterial micro-organisms.

23. The system as in. claim 1, wherein the aeration tank further comprises an aerated suspension of granular activated carbon having adsorbed on its surface biologically refractory and/or bio-inhibitory compounds from the wastewater stream and having active waste-digesting bacterial micro-organisms retained in its pores.

24. The system as in claim 1, wherein the separation subsystem is a screen located in the aeration tank for maintaining the granular activated carbon in the aeration tank with the mixed liquor and preventing passage of at least a majority of the granular activated carbon to the membrane operating system tank.

* * * * *